US00RE35333E

United States Patent [19]

Iwasaki et al.

[11] E Patent Number: Re. 35,333

[45] Reissued Date of Patent: Sep. 24, 1996

[54] INFRARED DETECTOR

[75] Inventors: Naoko Iwasaki; Katsuhiro Ohno, both of Amagasaki, Japan

[73] Assignee: Mitsubishi Denki Kabushiki Kaisha, Tokyo, Japan

[21] Appl. No.: 261,815

[22] Filed: Jun. 17, 1994

Related U.S. Patent Documents

Reissue of:

[64] Patent No.: 5,260,575
Issued: Nov. 9, 1993
Appl. No.: 29,033
Filed: Mar. 10, 1993

[30] Foreign Application Priority Data

May 19, 1992 [JP] Japan ..... 4-152658

[51] Int. Cl.[6] ..... G01J 5/06

[52] U.S. Cl. ..... 250/352; 62/51.1

[58] Field of Search ..... 250/370.15, 352; 62/51.1

[56] References Cited

U.S. PATENT DOCUMENTS

| | | | |
|---|---|---|---|
| 4,262,200 | 4/1981 | Guy | 250/352 |
| 4,451,735 | 5/1984 | Diebrich et al. | 250/352 |
| 4,474,036 | 10/1984 | Ball et al. | 250/352 |
| 4,862,002 | 8/1989 | Wang et al. | 250/352 |
| 4,918,312 | 4/1990 | Wellman et al. | 250/352 |
| 5,111,050 | 5/1992 | Maassen et al. | 250/352 |
| 5,177,364 | 1/1993 | Gowlett et al. | 250/352 |
| 5,179,283 | 1/1993 | Cockran et al. | 250/352 |

FOREIGN PATENT DOCUMENTS

0419371A1 3/1991 European Pat. Off. .

OTHER PUBLICATIONS

Abstract of Japanese Patent, vol. 14, No. 515 (E-1000)(4458), Nov. 13, 1990.

Abstract of Japanese Patent, vol. 13, No. 26 (E-706)(3374), Jan. 20, 1989.

*Primary Examiner*—Constantine Hannaher

*Attorney, Agent, or Firm*—Wolf, Greenfield & Sacks, P.C.

[57] ABSTRACT

An infrared detector wherein an infrared detecting device can be cooled efficiently without increasing thermal stresses generated in the device body owing to cooling during the operation of the detector, and intrusion of ambient light can be prevented. A container for the infrared detecting device, which includes a bottom plate having a projection formed in the center thereof, is provided on an inner end portion of an inner cylinder constituting a dewar, and the infrared detecting device is placed on and secured to the projection of the bottom plate. The container bottom plate is made of an Invar, while the end portion of the inner cylinder is made of a Kovar or an Invar.

10 Claims, 3 Drawing Sheets

INFRARED DETECTOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an infrared detector that detects infrared radiation from an object as image information. More particularly, the present invention relates to a structure for mounting an infrared detecting device accommodated in a dewar and driven while being cooled to cryogenic temperatures for the outside of the dewar.

2. Description of the Prior Art

Infrared detectors that utilize a semiconductor silicon Schottky junction are difficult to operate at room temperature because of their low junction barrier. Therefore, this type of infrared detector must be operated in a state where they are cooled to cryogenic temperatures (liquid nitrogen temperature of about 80 K.) in order to remove temperature disturbance. For this reason, an infrared detecting device is mounted in a vessel called a dewar, which has a special structure that is provided with a window for transmitting infrared radiation and capable of cooling the detecting device to cryogenic temperatures. In this state, the detecting device is driven to detect infrared radiation.

FIG. 2 is a sectional view showing the structure of a conventional infrared detector of the type described above. In the figure, reference number 1 denotes a dewar the inside of which is kept at a vacuum. The dewar 1 comprises an outer cylinder 1b having a window member 1a hermetically bonded thereto for transmitting incident infrared radiation 3, and an inner cylinder 1c that is united with the outer cylinder 1b so as to form a cooler insertion space 10, which will be described later. The inner cylinder 1c is made of a glass, ceramic or metallic material which exhibits a small thermal conductivity at cryogenic temperatures, for example, borosilicate glass, metallic titanium, etc. A container 4 for mounting a detecting device is attached to an inner cylinder end portion 1d made of a Kovar. The container 4 comprises a bottom plate 4a of aluminum nitride (AIN) or silicon carbide (SiC) which is secured to a surface of the inner cylinder end portion 1d that is disposed inside the dewar 1, and a frame 4b of alumina ($Al_2O_3$) or mullite ($Al_2O_3$:$SiO_2$= 1:1) which is attached to the periphery of the bottom plate 4a and which is provided with terminals 11 for taking out an electric signal from a semiconductor infrared detecting device 6. Reference numerals 6a and 6b respectively denote first and second major surfaces of a semiconductor substrate that constitutes the detecting device 6. The first major surface 6a is formed with an infrared receiving part and a readout mechanism for reading out a signal from the infrared receiving part. The infrared detecting device 6 is disposed such that the first major surface 6a faces the bottom plate 4a of the container 4, and it is secured to the frame 4b of the container 4, thereby being mounted in the dewar 1. A cold shield 7 is attached to the frame 4b so as to cover the infrared detecting device 6, thereby forming a wall for shielding stray light of incident infrared radiation. A metallic conductor 14 electrically connects together a signal output part of the infrared detecting device 6 and an internal metallic lead formed inside the container 4. A dewar internal conductor 8 is connected to a terminal 11 of the frame 4b through a metallic conductor 12, disposed along the side wall of the inner cylinder 1c and led out of the dewar 1 through a metallic conductor 13 via an external terminal 9 extending through the outer cylinder 1b and hermetically sealed with glass. Reference numeral 10 denotes a cooler insertion space formed by the inner cylinder 1c.

The operation of the conventional infrared detector will be explained below.

Infrared radiation 3 that enters the dewar 1 through the window member 1a forms an image on the reverse surface of the semiconductor detecting device 6 (i.e., the first major surface 6a of the substrate), producing carrier charge in accordance with the intensity of the incident infrared radiation. The charge is read by a charge transfer part integrated with the detecting device 6 as one unit, and the read information is sent to an external signal processing circuit through the metallic conductors 14, the container internal metallic leads, the terminals 11, the metallic conductors 12, the dewar internal conductors 8, the metallic conductors 13 and the external terminals 9 and displayed as image information. During the detector operation, the detecting device 6 is cooled to a level of 80 K. through the dewar inner cylinder end portion 1d by a cooling means, comprising a cooler, e.g., a Joule-Thomson or closed cycle cooler, which is inserted in the cooler insertion space 10 formed in the dewar 1.

In the conventional infrared detector with the above-described arrangement, the detecting device 6 is cooled through a heat transfer path formed from the dewar inner cylinder end portion 1d, the container bottom plate 4a and the frame 4b, and only the peripheral portion of the detecting device 6 is secured to the frame 4b. Accordingly, the thermal resistance is disadvantageously high, and it is difficult to realize efficient cooling.

In addition, since each member that constitutes the infrared detector is used over a wide temperature range of from room temperatures to cryogenic temperatures, a material for each member needs to be selected by taking into consideration characteristics, durability and thermal expansion under such temperature conditions. If the selection of a material is not properly made, the detecting device 6 or the container bottom plate 4a may be damaged by thermal stresses generated owing to a mismatch in thermal expansion during cooling.

FIG. 4 is a fragmentary sectional view showing the right-hand half of the peripheral portion of the detecting device 6 in the conventional detector structure, shown in FIG. 2. In the figure, the same reference numerals as those in FIG. 2 denote the same elements or portions. The point A shows the central portion of the infrared detecting device 6. The point A' shows an area where the infrared detecting device 6 is bonded to the frame 4b. The arrows represent stresses generated in the device 6. FIG. 5 is a graph showing contraction stresses generated on the device surface (A—A' in FIG. 4) in a direction X (horizontal direction as viewed in FIG. 4) when the composite structure, which comprises the inner cylinder 1c of the dewar 1, the inner cylinder end portion 1d, the bottom plate 4a of the container 4, the container frame 4b, the infrared detecting device 6 and the cold shield 7, is cooled from a room temperature (300 K.) to a cryogenic temperature (77 K.). As will be clear from FIG. 5, stresses that are generated on the device surface in the conventional structure are in the range of 2.9 to 4.8 kgf/mm$^2$. Here, a positive value for stress represents tensile stress, whereas a negative value represents compressive stress. In general, a brittle material such as aluminum nitride or silicon carbide may be cracked by tensile stress. Therefore, in the conventional device structure, the container bottom plate 4a or the detecting device 6 may be damaged by thermal stresses generated during cooling.

FIG. 3 is a sectional view showing the structure of another conventional infrared detector disclosed in Japanese Patent Application Public Disclosure No. 2-214158 (1990). In the figure, a dewar 21 the inside of which is kept at a vacuum comprises a tubular portion 21a and a window portion 21b that is formed at the upper end of the tubular portion 21a for allowing infrared radiation to enter the dewar 21. A cooling means 23 is inserted into a recess formed in the tubular portion 21a. An infrared detecting device 26 is secured at its peripheral portion to a support 24. Reference numerals 26a and 26b respectively denote first and second major surfaces of the infrared detecting device 26. The first major surface 26a is formed with a readout mechanism for reading out a signal from an infrared receiving part. The first major surface 26a is directly placed on and secured to the inner surface of the upper end of the recess formed in the tubular portion 21a of the dewar 21. Internal metallic leads 27 are electrically connected to the infrared detecting device 26 through metallic conductors 28. External metallic leads 29 are provided to lead out an output from the infrared detecting device 26. Metallic leads 30 are secured to the inner surfaces of the tubular portion 21a. Electrodes 31 are used to take out the output signal from the detecting device 26 in the dewar 21 to the outside of the dewar 21. Metallic conductors 32 and 33 provide electrical connector between the metallic leads 29 and 30 and between the leads 30 and the electrodes 31.

In this infrared detector, since the first major surface 26a of the infrared detecting device 26 is directly placed on and secured to the upper end of the recess formed in the tubular portion 21a of the dewar 21, the thermal resistance between the cooling means 23 and the infrared detecting device 26 can be reduced, and the cooling efficiency can be improved by a large margin. Accordingly, the problems attendant on the structure of the first-described prior art are solved. In this structure, however, the infrared detecting device 26 is not provided in a container but directly placed on and secured to the upper end of the recess of the dewar 21. Accordingly, light that enters the dewar 21 from the outside and that is reflected from the inner wall of the dewar 21 may enter the device 26 through a surface thereof (first major surface 26a) to form a noise component, causing the device characteristics to be deteriorated. In addition, the device 26 may be damaged when mounted in the dewar 21, and if such occurs, the reliability of the device 26 lowers.

Thus, the first conventional infrared detector, shown in FIG. 2, suffers from the problem that the thermal resistance increases when the detecting device is cooled, and it is therefore difficult to realize efficient cooling. In addition, the detecting device or the container bottom plate may be damaged by thermal stresses generated owing to a mismatch in thermal expansion during cooling.

In the second conventional infrared detector, shown in FIG. 3, intrusion of ambient light cannot be prevented, so that the device characteristics may be deteriorated. The second prior art further suffers from the problem that the device may be damaged when mounted in the dewar.

SUMMARY OF THE INVENTION

In view of the above-described problems of the prior art, it is an object of the present invention to provide an infrared detector which is designed so that the detecting device can be cooled efficiently without increasing the thermal stresses generated in the device body owing to cooling during the operation of the detector, and it is also possible to prevent intrusion of ambient light and enable the device to be readily disposed in the dewar.

To this end, the present invention provides an infrared detector including a dewar having an outer cylinder with a window for transmitting incident infrared radiation, and an inner cylinder united with the outer cylinder so as to form a space for inserting cooling means, and an infrared detecting device accommodated in the dewar and driven while being cooled to a cryogenic temperature by the cooling means from the outside of the dewar. The infrared detector further includes a container for accommodating the infrared detecting device. The container includes a bottom plate having a projection projecting inwardly of the container from an inner surface thereof. The infrared detecting device is secured to the projection of the bottom plate, and the bottom plate is secured to an end portion of the inner cylinder which is disposed in the dewar, thereby disposing the container in the dewar.

The bottom plate of the container for the infrared detecting device may be made of an [Invar] *nickel-iron alloy, also known under the trademark INVAR.*

In addition, the present invention provides an infrared detector including a dewar having an outer cylinder with a window for transmitting incident infrared radiation, and an inner cylinder united with the outer cylinder so as to form a space for inserting cooling means, and an infrared detecting device accommodated in the dewar and driven while being cooled to a cryogenic temperature by the cooling means for the outside of the dewar. The infrared detecting device is a silicon infrared detecting device, and an end portion of the inner cylinder which is disposed inside the dewar is made of a [Kovar] *nickel-cobalt-iron alloy, also known under the trademark KOVAR* or an [Invar] *nickel-iron alloy.* The silicon infrared detecting device is accommodated in a container which includes a bottom plate made of an [Invar] *nickel-iron alloy* and having a projection projecting inwardly of the container from an inner surface thereof. The silicon infrared detecting device is secured to the projection of the bottom plate, and the bottom plate is secured to the end portion of the inner cylinder of the dewar, thereby disposing the container in the dewar.

In the present invention, the infrared detecting device is placed on and secured to the projection formed on the container bottom plate. Accordingly, heat that is generated from the device is transmitted to the cooling means through the container bottom plate and the end portion of the dewar inner cylinder, so that efficient cooling is realized. Further, since the device is provided in the container and this container is disposed in the dewar, intrusion of ambient light is effectively prevented, and it is easy to handle the device when it is mounted in the dewar.

In addition, since the container bottom plate, which has a projection formed in the center thereof, is made of an [Invar] *nickel-iron alloy*, machining of the bottom plate is facilitated.

Further, since the device is placed on and secured to the container bottom plate, the cooling efficiency improves. Moreover, since the container bottom plate is made of [Invar] *nickel-iron alloy*, while the end portion of the inner cylinder if made of a [Kovar] *nickel-cobalt-iron alloy* or an [Invar] *nickel-iron alloy*, machining of the bottom plate is facilitated, and thermal stresses that are generated in the peripheral portion of the device can be held down to a low level at which no damage is caused to the device. In addition, since the device is provided in the container, intrusion of ambient light can be prevented, and it is possible to facilitate handling of the device when it is mounted in the dewar.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DESCRIPTION OF THE PREFERRED EMBODIMENTS

Figure 1:
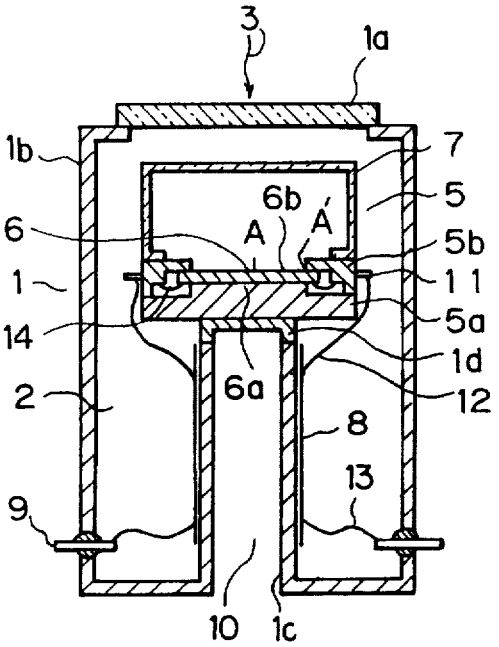
FIG. 1 is a sectional view of an infrared detector according to one embodiment of the present invention.

One embodiment of the present invention will be described below with reference to the accompanying drawings. FIG. 1 is a sectional view showing the structure of an infrared detector according to one embodiment of the present invention. In the figure, the same reference numerals as those in FIG. 2 denote the same elements or portions. However, reference numeral 5 denotes a container which comprises a bottom plate 5a made of an [Invar] *nickel-iron alloy* (36% Ni-64% Fe) and having a projection formed in the center thereof, and a frame 5b of alumina which is bonded to the peripheral portion of the bottom plate 5a. The feature of this embodiment resides in that the inner cylinder end portion 1d of the dewar 1 is made of a [Kovar] *nickel-cobalt-iron alloy* (29% Ni-17% Co-54% Fe), and the infrared detecting device 6 is directly placed on and secured to the projection formed in the center of the container bottom plate 5a made of the [Invar] *nickel-iron alloy*.

It was decided to employ the above-described constituent materials on the basis of the results of a simulation carried out using a computer. That is, contraction stresses generated when the composite structure, which comprised the inner cylinder 1c of the dewar 1, the inner cylinder end portion 1d, the bottom plate 5a of the container 5, the container frame 5b, the infrared detecting device 6 and the cold shield 7, was cooled from a room temperature (300 K.) to a cryogenic temperature (77 K.) were measured by a computer numerical analysis based on the finite element method with each kind of constituent material used as a parameter, and utilized particularly for evaluation of stresses in the infrared detecting device 6.

Figure 2:
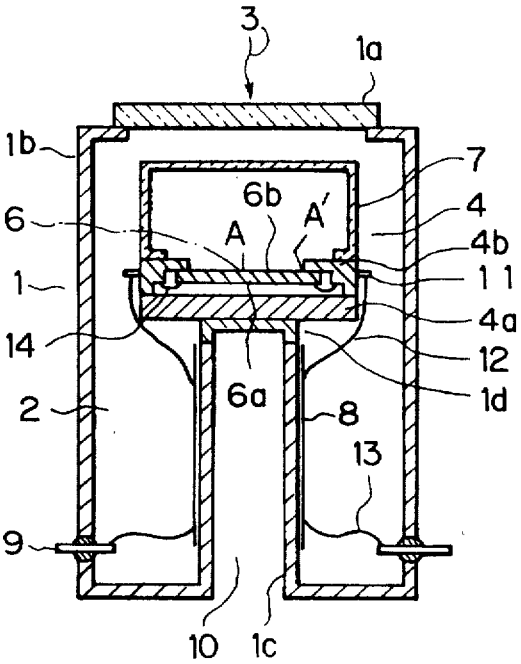
Fig. 2 (PRIOR ART)
FIG. 2 is a sectional view of a conventional infrared detector.
Figure 3:
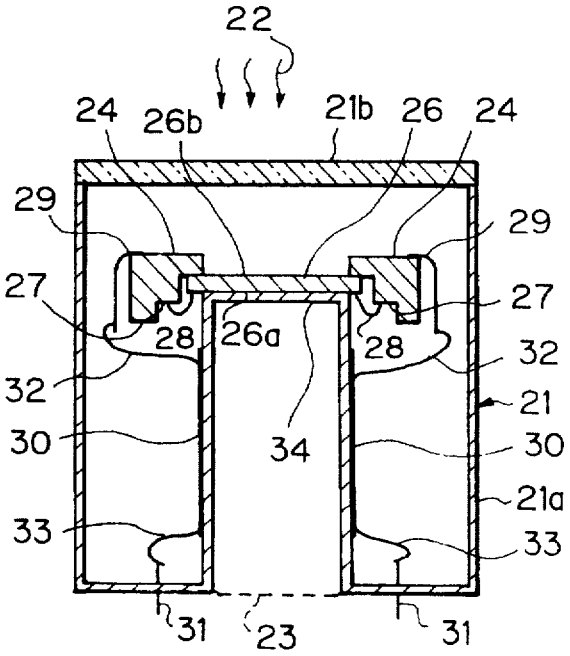
Fig. 3 (PRIOR ART)
FIG. 3 is a sectional view of another conventional infrared detector.
Figure 4:
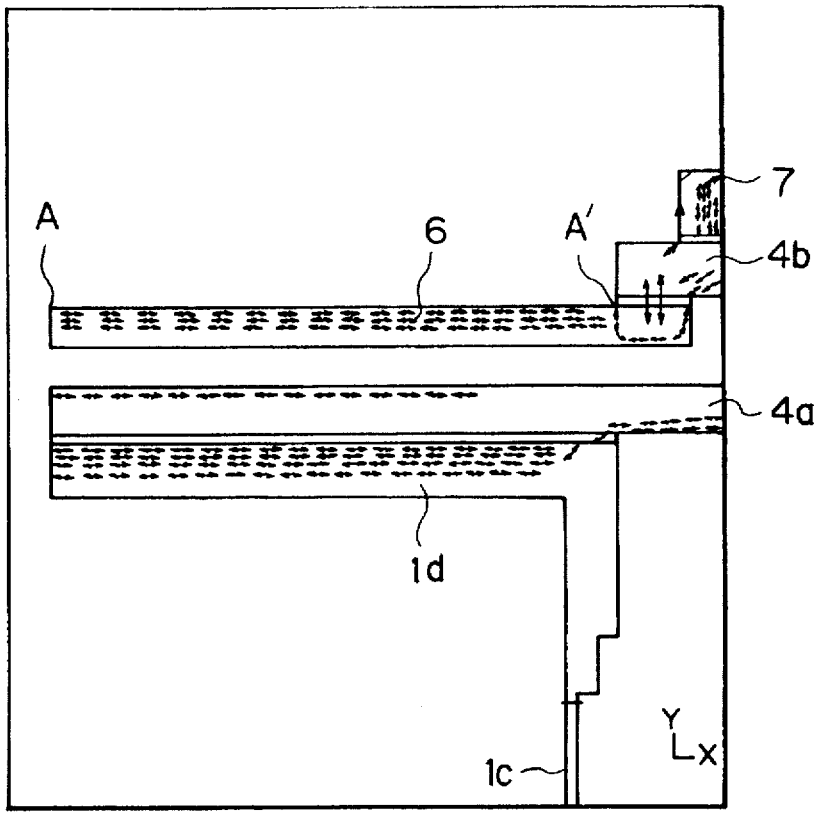
Fig. 4 (PRIOR ART)
FIG. 4 is a fragmentary enlarged view of a peripheral portion of a detecting device of a conventional infrared detector.
Figure 5:
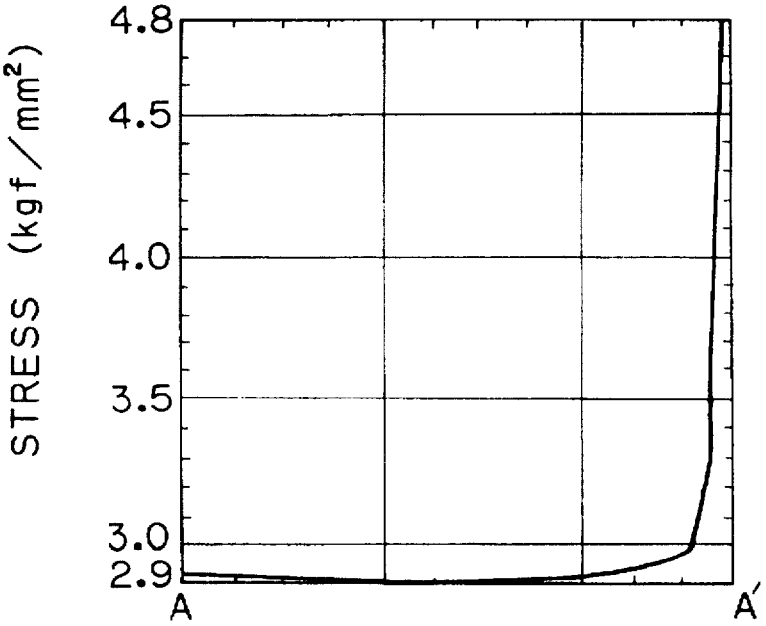
Fig. 5 (PRIOR ART)
FIG. 5 is a graph showing stresses generated on the device surface of a conventional infrared detector.
Figure 6:
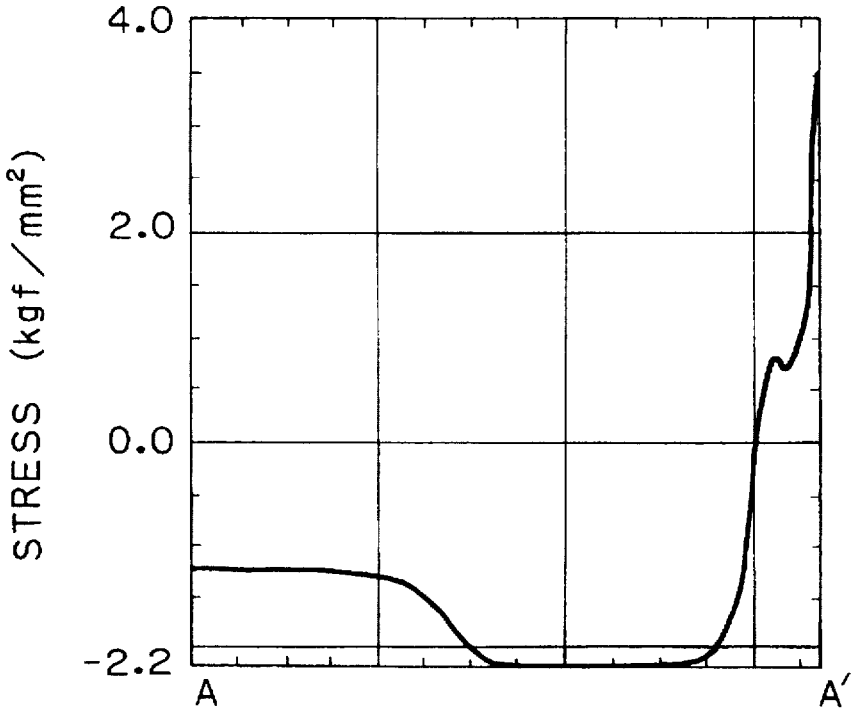
FIG. 6 is a graph showing stresses generated on the device surface of an infrared detector according to one embodiment of the present invention.

FIG. 6 is a graph showing a distribution of stresses generated on the device surface of the infrared detector in this embodiment. As will be clear from the graph, the results of the analysis reveal that stresses generated on the surface of the device in this embodiment are in the range of −2.2 to 4.0 kgf/mm$^2$, and that the maximum stress in the detector of this embodiment is 4.0 kgf/mm$^2$, whereas the maximum stress in the conventional infrared detector, shown in FIG. 2, is 4.8 kgf/mm$^2$. Thus, in the detector of this embodiment, stresses generated in the device body are held down to a lower level than in the case of the conventional detector.

Further, in the conventional detector structure, shown in FIG. 2, cooling of the infrared detecting device is effected through container bottom plate and the frame. In the infrared detector of this embodiment, however, the detecting device 6 is mounted directly on the projection formed in the center of the container bottom plate 5a, so that efficient cooling can be performed through a heat transfer path which is formed from the dewar inner cylinder end portion 1d and the container bottom plate 5a.

Further, since in this embodiment the container 5 is comprised of the bottom plate 5a and the frame 5b, which is bonded to the peripheral portion of the bottom plate 5a, and the infrared detecting device 6 is placed on and secured to the projection of the bottom plate 5a, there is no likelihood that light that enters the dewar 1 and that is reflected from the dewar inner wall will enter the device 6 through the surface 6a thereof. Thus, it is possible to prevent intrusion of ambient light and hence possible to reduce noise and improve the device characteristics.

In addition, since the device 6 is disposed in the container 5, it is easy to handle the device 6 when it is mounted in the dewar 1. Accordingly, reliability of the device 6 is improved.

Further, since the container bottom plate 5a is made of an [Invar] *nickel-iron alloy* machining of the bottom plate 5a is facilitated.

Next, the structure of an infrared detector according to another embodiment of the present invention will be described with reference to FIG. 1. In the figure, the same reference numerals as those in FIG. 2 denote the same elements or portions. However, reference numeral 5 denotes a container which comprises a bottom plate 5a made of an [Invar] *nickel-iron alloy* and having a projection formed in the center thereof, and a frame 5b of alumina which is bonded to the peripheral portion of the bottom plate 5a. In this embodiment, the inner cylinder end portion 1d of the dewar 1 is made of and [Invar] *nickel-iron alloy*.

Figure 7:
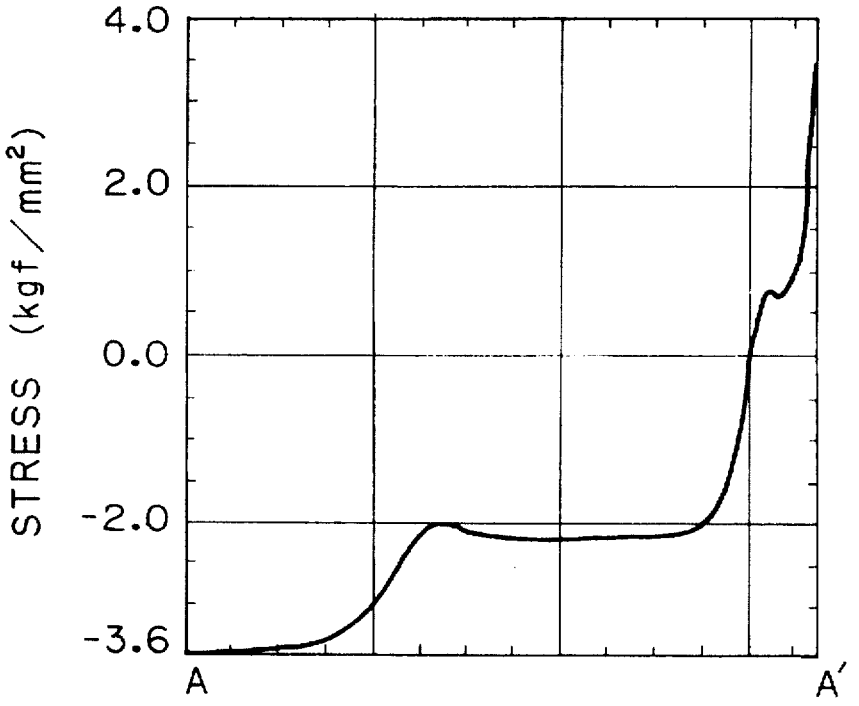
FIG. 7 is a graph showing stresses generated on the device surface of an infrared detector according to another embodiment of the present invention.

It was decided to employ the above-described constituent materials on the basis of the results of a simulation carried out using a computer in the same way as in the first embodiment. FIG. 7 is a graph showing a distribution of stresses generated on the device surface of the infrared detector in this embodiment. As will be clear from the graph, the results of the analysis reveal that stresses generated on the surface of the device in this embodiment are in the range of −3.6 to 4.0 kgf/mm$^2$, and that the maximum stress in the detector of this embodiment is 4.0 kgf/mm$^2$, whereas the maximum stress in the conventional infrared detector, shown in FIG. 2, is 4.8 kgf/mm$^2$. Thus, in the detector of this embodiment, stresses generated in the device body are held down to a lower level than in the case of the conventional detector.

Further, the infrared detector of this embodiment also provides advantageous effects similar to those in the first embodiment. That is, the cooling efficiency is high, and intrusion of ambient light can be prevented. Further, it is easy to mount the detecting device in the dewar, and it is also easy to effect machining during formation of the container bottom plate.

Thus, in the infrared detector of the present invention, the infrared detecting device is mounted directly on the projection formed in the center of the container bottom plate. Therefore, the device can be efficiently cooled during the operation. Further, since the bottom plate is made of an [Invar] *nickel-iron alloy* and the inner cylinder end portion is made of an [Invar] *nickel-iron alloy* or a [Kovar] *nickel-cobalt-iron alloy* it is possible to minimize stresses generated in the periphery of the bonded portion of the device when it is cooled to cryogenic temperatures. In addition, since the device is provided in the container and this container is disposed in the dewar, intrusion of ambient light can be prevent, and it is easy to handle the device when it is mounted in the dewar. Further, since the container bottom plate is made of an [Invar] *nickel-iron alloy* machining of the bottom plate is facilitated.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. An infrared detector including:

a dewar having an outer cylinder with a window for transmitting incident infrared radiation, and an inner cylinder united with said outer cylinder so as to form a space for inserting cooling means, an an infrared detecting device accommodated in said dewar and driven while being cooled to a cryogenic temperature by said cooling means from the outside of said dewar, wherein the improvement comprises a container for accommodating said infrared detecting device, said container including a bottom plate having a projection projecting inwardly of said container from an inner surface thereof, so that said infrared detecting device is secured to said projection of said bottom plate, said bottom plate being secured to an end portion of said inner cylinder which is disposed in said dewar, thereby disposing said container in said dewar.

2. An infrared detector according to claim 1, wherein said bottom plate of said container for said infrared detecting device is made of [an Invar] *a nickel-iron alloy*.

3. An infrared detector according to claim 1, wherein said container for said infrared detecting device comprises said bottom plate, a frame secured to said bottom plate to constitute a part of said container, and a cold shield secured to said frame to constitute a part of said container, and an upper surface of said infrared detecting device is secured to said frame.

4. An infrared detector according to claim 1, 2, or 3, wherein said infrared detecting device comprises a semiconductor substrate having a first major surface and a second major surface.

5. An infrared detector according to claim 3, wherein said infrared detecting device comprises a semiconductor substrate having a first major surface and a second major surface, said first major surface being connected to said frame through metallic conductors, said frame being provided with terminals, which are connected through metallic conductors to dewar internal conductors attached to a side surface of said inner cylinder inside said dewar, and said dewar internal conductors being connected through metallic conductors to external terminals provided on said outer cylinder of said dewar.

6. An infrared detector according to claim 1, wherein said end portion of said inner cylinder of said dewar is made of [Kovar] *a nickel-cobalt-iron alloy*.

7. An infrared detector according to claim 3, wherein said infrared detecting device comprises a semiconductor substrate having a first major surface and a second major surface, said first major surface being secured to said projection of said bottom plate, and said second major surface being bonded at a peripheral edge thereof to said frame.

8. An infrared detector according to claim 2, wherein said [Invar] *nickel-iron alloy* contains 36% Ni and 64% Fe.

9. An infrared detector according to claim 6, wherein said [Kovar] *nickel-cobalt-iron alloy* contains 29% Ni, 17% Co, and 54% Fe.

10. An infrared detector including;

a dewar having an outer cylinder with a window for transmitting incident infrared radiation, and an inner cylinder united with said outer cylinder so as to form a space for inserting cooling means, and an infrared detecting device accommodated in said dewar and driven while being cooled to a cryogenic temperature by said cooling means from the outside of said dewar, characterized in that said infrared detecting device is a silicon infrared detecting device, and an end portion of said inner cylinder which is disposed inside said dewar is made of [a Kovar or an Invar] *one of a nickel-iron alloy and a nickel-cobalt-iron alloy* said silicon infrared detecting device being accommodated in a container, said container including a bottom plate made of a [Invar] *nickel-iron alloy* and having a projection projecting inwardly of said container from an inner surface thereof, so that said silicon infrared detecting device is secured to said projection of said bottom plate, said bottom plate being secured to said end portion of said inner cylinder of said dewar, thereby disposing said container in said dewar.

* * * * *